United States Patent [19]
Majeau et al.

[11] 3,777,278
[45] Dec. 4, 1973

[54] PSEUDO-RANDOM FREQUENCY GENERATOR

[75] Inventors: Henrie L. Majeau, Bellevue; Kermit J. Thompson, Seattle, both of Wash.

[73] Assignee: The Boeing Company, Seattle, Wash.

[22] Filed: Sept. 10, 1971

[21] Appl. No.: 179,416

[52] U.S. Cl. .................... 331/78, 328/37, 328/59, 307/260
[51] Int. Cl. .................... H03b 29/00
[58] Field of Search .................... 328/59, 37; 307/260; 331/78

[56] References Cited

UNITED STATES PATENTS

| | | | |
|---|---|---|---|
| 3,171,082 | 2/1965 | Dillard et al. | 331/78 |
| 3,614,399 | 10/1971 | Linz | 331/78 |
| 3,617,925 | 11/1971 | Bensema | 331/78 |
| 3,633,015 | 1/1972 | Lee | 331/78 |

*Primary Examiner*—John Kominski
*Attorney*—Christensen, Garrison, O'Connor, and Havelka

[57] ABSTRACT

A frequency generator includes a clock source, a variable modulus counter, a fixed-modulus counter, a shift register and an exclusive-OR circuit. In order to obtain a truly pseudo-random sequence of frequencies at the output of the variable-modulus counter, for use in coding voice intercommunications or the like, pulses derived from the pseudo-random frequencies by the fixed modulus counter are used to clock the shift register which develops the pseudo-random sequence in conjunction with the exclusive-OR circuit and the variable-modulus counter.

6 Claims, 1 Drawing Figure

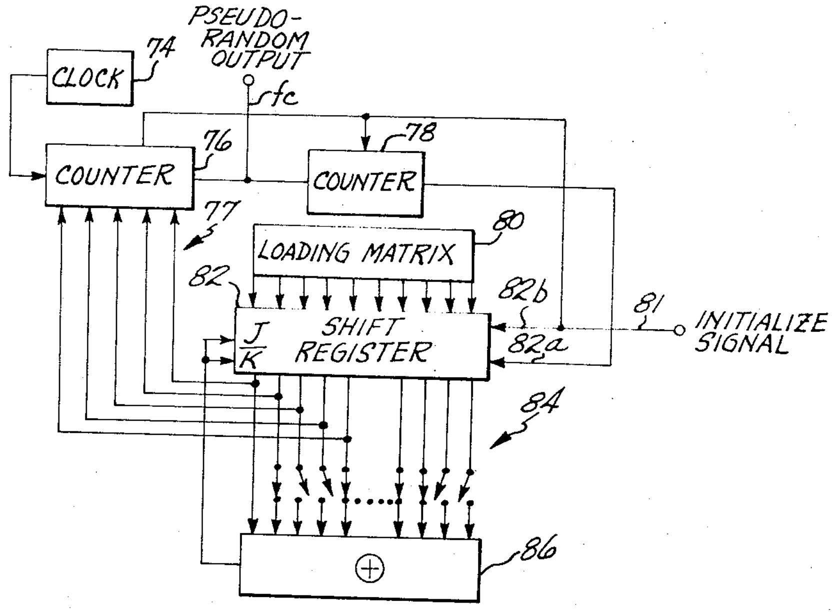
PSEUDO-RANDOM OUTPUT
fc
CLOCK
74
COUNTER
76
77
COUNTER
78
LOADING MATRIX
80
82
82b
81
INITIALIZE SIGNAL
J
K
SHIFT REGISTER
82a
84
86

PSEUDO-RANDOM FREQUENCY GENERATOR

BACKGROUND OF THE INVENTION

This invention relates to frequency generators, and, more particularly, to those generators providing pseudo-random sequences of frequencies.

Pseudo-random frequency generators have found many applications in correlation computers and other signal analysis systems, and in systems for coding and decoding voice signals in intercommunication systems to prevent unauthorized recognition thereof. An example of the latter type of systems is found in a copending application entitled "Voice Privacy Unit For Intercommunication Systems," by Henrie L. Majeau et al., which also assigned to the assignee of the present invention. In coding systems, it is desirable that, in order to make compromise of communications improbable, the pseudo-random frequency generator be capable of providing a large number of independent pseudo-random sequences or codes, and the changes within each sequence proceed in a true pseudo-random manner.

It is therefore an object of this invention to provide a frequency generator whose output varies in a true pseudo-random manner and which additionally provides a large number of valid pseudo-random sequences.

It is a further object of this invention to provide such a frequency generator which can be embodied in exclusively digital components.

SUMMARY OF THE INVENTION

These objects and others are achieved by using the pseudo-random frequencies to clock a shift register which develops the pseudo-random sequences.

BRIEF DESCRIPTION OF THE DRAWING

For a complete understanding of the invention, together with further objects and advantages thereof, reference should be made to the following portion of the specification, taken in conjunction with the accompanying Drawing in which the sole FIGURE is a combined schematic and block diagram of the pseudo-random frequency generator.

DESCRIPTION OF A PREFERRED EMBODIMENT

With reference now to the FIGURE, the generator includes a clock source 74 whose output is coupled to the clocking input of a counter 76 whose counting range or modulus is a variable under control of logic signals applied to a plurality of loading inputs. The operation of clock 74 and variable-modulus counter 76 is similar to that of a voltage controlled oscillator, in that the output frequency is controlled by the input or control signal supplied thereto.

The output frequency from counter 76, or $f_c$, is coupled through a fixed-modulus counter 78 to the clocking input 82*a* of a shift register 82. Preferably, shift register 82 is of a type which allows pre-loading of the stages thereof in response to an enabling signal. To this end, the outputs of a loading matrix 80 are connected to corresponding pre-loading inputs of shift register 82.

The stages of shift register 82, excluding the last stage which is directly connected to an exclusive-OR circuit 86, are coupled to a corresponding plurality of feedback switches 84, which may be either opened or closed. The output terminals of the feedback switches

84 are in turn connected to the inputs of an exclusive-OR circuit whose single output is coupled to the input of the first stage of shift register 82. In addition, the outputs of a predetermined number of the stages of shift register 82 are coupled to the loading inputs of the variable-modulus counter 76.

The operation of the generator will now be described. When an initialize signal is provided on a line 81, it resets counter 76 and 78 and, when applied to an enabling terminal 82*b* of shift register 82, transfers a preset digital number from coding matrix 80 to the corresponding stages of shift register 82. The signals on a predetermined number of outputs of loading matrix 80 are fixed at either a logic 1 or a logic 0, while the signals on the remaining output terminals are switchable, by means not shown, between logic 1 and logic 0. By appropriate manipulation of these switches, a digital number may be preset in loading matrix 80. In this manner, the shift register 82 always has the same digital word contained therein at the start of its operation.

The portion of the digital word contained in the stages of shift register 82 which are coupled to the loading inputs of variable-modulus counter 76 is also loaded into counter 76.

At the start of operation, counter 76 therefore produces an output pulse for a predetermined number of input pulses thereto, as determined by the digital word which has been transferred from shift register 82. It may be assumed for purposes of discussion that counter 76 initially provides output pulses at a frequency of 3,000 Hz. These output pulses are applied directly to the input of fixed-modulus counter 78 which produces therefrom clock pulses having a much lower frequency. In the above example, the frequency of the clock pulses may be 50 Hz.

These clock pulses are applied to the clocking input of shift register 82. In response to the first clock pulse, the digital word in shift register 82 is shifted one stage to the right. At the same time, a new bit which is obtained from the combination of feedback switches 84 and exclusive-OR circuit 86 is entered into the first stage of shift register 82.

The pseudo-random sequence is determined by *a*) the digital word which is transferred into shift register 82 from loading matrix 80 and *b*) the setting of feedback switches 84. Selective closure of the feedback switches 84 determines which of the stages of shift register 82 are to be compared in exclusive-OR circuit 86.

The operation of exclusive-OR circuit 86 may be visualized by considering the comparison made in a two-terminal exclusive-OR gate. If both inputs to an exclusive-OR gate are logic 1 or logic 0, the output thereof is a logic 0, whereas if either input is a logic 0 and the other is a logic 1, the output is a logic 1. Accordingly, exclusive-OR circuit 86 feeds a logic 1 or logic 0 into the first stage of shift register 82 with each clocking pulse from counter 78. Therefore, the digital word contained in shift register 82 is changed.

Since a certain number of the stages of shift register 82 are coupled to the loading inputs of counter 76, the modulus of counter 76 is also changed for every clock pulse from counter 78. Since counter 78 has a fixed-modulus, the period of the new clock pulse therefrom is different from that immediately preceding so that the time period during which the second set of pulses from counter 76 is produced is different from the time period during which the initial set of pulses was produced.

For example, the frequency $f_c$ may be changed from 3,000 Hz to 3,300 Hz, which in turn produces a change in the clock pulse from counter 78 from 50 to 55 Hz.

When counter 78 provides its next clock pulse, the contents of shift register 82 are again shifted one stage to the right, and a new bit entered into the first stage from exclusive-OR circuit 86, in accordance with the shifted contents of the shift register 82 and the setting of feedback switches 84. As before, the modulus of counter 76 is again varied to produce a new output frequency $f_c$ therefrom.

This output frequency $f_c$ varies in a pseudo-random manner and steps from one value to another in response to each clock pulse from counter 78, The value of the frequency is determined by the digital word obtained in those stages of shift register 82 that are connected to the inputs of counter 76. The length of time that any one frequency $f_c$ is produced is also variable, because of the fact that the clock pulses used to step from the first frequency to the second frequency are developed from the first frequency by fixed-modulus counter 78.

The number of valid codes or independent pseudo-random sequences that can be produced is dependent upon the number of stages in the shift register 82, the number of stages compared in exclusive-OR gate 86, and the number of independent digital bits provided by loading matrix 80. If shift register 82 includes 15 stages, with all 15 stages being compared in an exclusive-OR circuit 86, up to 5,461 maximum length pseudo-random sequences can be provided, each sequence being different. If non-primitive sequences are eliminated, the number of independent sequences reduces to 2,190. To obtain additional, unique sequences from these sequences, the loading of the shift register 82 is changed under control of loading matrix 80. If four of the outputs thereof are switchable between logic 0 and logic 1, the total number of distinct sequences or codes that is available is $2190(2^4)=35,040$. The number of codes can be increased with a 15-stage shift register by considering non-primitive series and increasing the outputs of loading matrix 80 that are switchable.

Because of the large number of truly pseudo-random sequences that are available with the generator of this invention, the use thereof in a voice communications system for "scrambling" voice communications makes compromise improbable. In addition, since the rate of change from one pseudo-random sequence to another is also variable, compromise is doubly difficult.

The components of the preferred embodiment are all commercially available. For example, a working model includes the following elements: shift register 82, Texas Instruments type SN 74199N; exclusive-OR circuit 86, Texas Instruments type SN 74180N; counters 76 and 78; Texas Instruments type SN 74197N. In this model, loading matrix 80 comprised a source of logic 1 and logic 0 signals and four mechanical switches, feedback switches 84 comprised 14 mechanical switches, and clock 74 a standard 1 MHz oscillator.

When the invention has thus been described with respect to a preferred embodiment thereof, it should be clearly understood by those skilled in the art that the invention is not limited thereto but rather is intended to be bounded only by the limits of the appended claims.

What is claimed is:

1. A pseudo-random frequency generator comprising a shift register having a predetermined number of stages, each stage having an output terminal, said shift register further including a clocking input and a signal input, a generator means having a control input and an output terminal and operative to provide a frequency on said output terminal which is determined by a signal presented to said control input, means coupling a first number of said output terminals of said shift register to said control input of said generator means, an exclusive-OR circuit having a plurality of input terminals, means coupling a second number of the output terminals of said shift register to the input terminals of said exclusive-OR circuit, said exclusive-OR circuit being operative to provide a data signal to the signal input of said shift register in response thereto and means coupling the output terminal of said generator means to the clocking input of said shift register.

2. A generator as recited in claim 1, wherein said generator means comprises a clock source, and a variable-modulus counter having a clocking input which is coupled to said clock source, wherein the modulus of said variable-modulus counter is established by a signal presented to said control input from said shift register.

3. A generator as recited in claim 1, wherein said shift register further includes an enabling input, and means including a plurality of input terminals for loading a digital word on said input terminals into corresponding stages of said shift register in response to a signal at said enabling input, and further including a loading matrix for applying said digital word to said input terminals.

4. A generator as recited in claim 3, wherein said loading matrix comprises a source of logic signals and a plurality of switching means for selectively coupling said source of logic signals to said input terminals of said shift register.

5. A generator as recited in claim 1, wherein said coupling means further comprises a plurality of switches for selectively determining which of the outputs of said shift register are to be compared in said exclusive-OR circuit.

6. A generator as recited in claim 1, wherein said second coupling means comprises a fixed-modulus counter.

* * * * *

UNITED STATES PATENT OFFICE

CERTIFICATE OF CORRECTION

Patent No. 3,777,278 Dated December 4, 1973

Inventor(s) Henrie L. Majeau, et al.

It is certified that error appears in the above-identified patent and that said Letters Patent are hereby corrected as shown below:

After Ref.: "[56] References Cited" . . . and before "Abstract" change "Christensen, Garrison, O'Connor, and Havelka" to --CHRISTENSEN, O'CONNOR, GARRISON & HAVELKA--.

Signed and sealed this 16th day of July 1974.

(SEAL)
Attest:

McCOY M. GIBSON, JR.
Attesting Officer

C. MARSHALL DANN
Commissioner of Patents